(12) United States Patent
Zeon et al.

(10) Patent No.: US 9,580,164 B2
(45) Date of Patent: Feb. 28, 2017

(54) APPARATUS AND METHODS FOR JOINING AIRCRAFT COMPOSITE STRUCTURES

(71) Applicant: The Boeing Company, Chicago, IL (US)

(72) Inventors: Young Zeon, Edmonds, WA (US); Gerfried Rudolf Achtner, Mukilteo, WA (US); Joseph Strachila, Mount Vernon, WA (US)

(73) Assignee: The Boeing Company, Chicago, IL (US)

( * ) Notice: Subject to any disclaimer, the term of this patent is extended or adjusted under 35 U.S.C. 154(b) by 498 days.

(21) Appl. No.: 13/938,731

(22) Filed: Jul. 10, 2013

(65) Prior Publication Data

US 2015/0014484 A1 Jan. 15, 2015

(51) Int. Cl.
*B64C 1/06* (2006.01)
*B64C 1/26* (2006.01)
*B64C 3/18* (2006.01)
*B64C 3/26* (2006.01)

(52) U.S. Cl.
CPC ............... *B64C 1/26* (2013.01); *B64C 3/182* (2013.01); *B64C 3/26* (2013.01); *Y10T 29/49622* (2015.01)

(58) Field of Classification Search
CPC ..... B64C 1/26; B64C 3/26; B64C 2001/0054; B64C 2001/0072; B64C 1/00–1/12; B64C 3/18–3/187
See application file for complete search history.

(56) References Cited

U.S. PATENT DOCUMENTS

| 4,556,592 | A | * | 12/1985 | Bannink, Jr. ............... 428/43 |
| 6,328,260 | B1 | * | 12/2001 | Tarbox et al. ............ 244/131 |
| 6,808,143 | B2 | | 10/2004 | Munk et al. |
| 7,195,418 | B2 | | 3/2007 | Durand et al. |
| 2005/0116105 | A1 | * | 6/2005 | Munk et al. ............... 244/123 |
| 2008/0128550 | A1 | * | 6/2008 | Roming et al. ............ 244/119 |
| 2008/0128553 | A1 | * | 6/2008 | Brown et al. ............ 244/124 |
| 2009/0065644 | A1 | | 3/2009 | Jacques |
| 2011/0089292 | A1 | * | 4/2011 | Williams et al. ............ 244/131 |

(Continued)

OTHER PUBLICATIONS

European Patent Office, "Extended European Search Report," issued in connection with Application No. 14175576.9, Nov. 11, 2014, 8 pages.

(Continued)

*Primary Examiner* — Brian M O'Hara
*Assistant Examiner* — George Andonyan
(74) *Attorney, Agent, or Firm* — Hanley, Flight & Zimmerman, LLC (57) ABSTRACT

Apparatus and method for joining composite structures of aircrafts are disclosed. An example apparatus includes an inboard composite wing panel having a first end portion configured to be coupled to upper and lower inboard fittings composed of a metallic material and an outboard composite wing panel having a first end portion configured to be coupled to upper and lower outboard fittings composed of a metallic material. A side of body rib has a plate shaped first end portion composed of a metallic material. A fuselage frame is configured to be joined at one end of the upper inboard fitting, and the upper and lower inboard fittings and the upper and lower outboard fittings are coupled to the side of body rib at the plate shaped first end portion.

15 Claims, 9 Drawing Sheets

(56) References Cited

U.S. PATENT DOCUMENTS

| | | | |
|---|---|---|---|
| 2011/0147521 A1 | 6/2011 | Delahaye et al. | |
| 2011/0303357 A1 | 12/2011 | Plaza et al. | |
| 2012/0286090 A1 | 11/2012 | Guittard et al. | |
| 2013/0062467 A1 | 3/2013 | Soenarjo | |
| 2013/0233973 A1* | 9/2013 | Nordman et al. | 244/131 |
| 2013/0236692 A1* | 9/2013 | Tanaka et al. | 428/137 |
| 2014/0008493 A1* | 1/2014 | Whitlock et al. | 244/123.7 |
| 2014/0131518 A1* | 5/2014 | Lin et al. | 244/131 |
| 2014/0209744 A1* | 7/2014 | Marcoe et al. | 244/123.1 |
| 2014/0361121 A1* | 12/2014 | Cominsky et al. | 244/131 |
| 2015/0024160 A1* | 1/2015 | Georgeson et al. | 428/60 |

OTHER PUBLICATIONS

Canadian Intellectual Property Office, "Office Action," issued in connection with Canadian Application No. 2,850,800, dated Apr. 23, 2015, 4 pages.

Canadian Intellectual Property Office, "Office Action," issued in connection with Application No. 2,850,800, Mar. 1, 2016, 4 pages.

\* cited by examiner

APPARATUS AND METHODS FOR JOINING AIRCRAFT COMPOSITE STRUCTURES

FIELD

The present disclosure relates generally to aircrafts and, more particularly, to apparatus and methods for joining composite structures of aircrafts.

BACKGROUND

An aircraft wing of a commercial aircraft or jetliner is typically assembled prior to being attached to a fuselage of the aircraft. For example, an aircraft wing assembly typically includes a front spar and a rear spar each of which extends in the span direction of the wing, and structural members such as, for example, stringers and ribs that connect to the front and rear spar to form a skeletal structure or framework of the aircraft wing. A wing panel or skin, which may be formed with stringers, is coupled to the skeletal structure or framework to form an aircraft wing.

To couple or attach the aircraft wing to the fuselage, commercial aircrafts employ wing-fuselage attachment joints. For example, a wing-fuselage joint couples an aircraft wing to a central wing box supported by the fuselage of the aircraft. The aircraft wing is often attached to the central wing box via an upper wing panel joint and a lower wing panel joint. Typically, an upper wing panel joint employs a double plus chord composed of aluminum to couple an upper wing panel of the aircraft wing to the central wing box and a lower wing panel joint employs a T-chord to couple a lower wing panel of the aircraft wing to the central wing box.

Further, because of their relatively high strength-to-weight ratios, composite materials such as carbon-fiber reinforced plastics are often used in aircraft wings to reduce weight and increase performance. For example, the upper and lower wing panels of an aircraft wing or central wing box may be composed of a carbon composite or carbon fiber reinforced polymer, while wing spars, ribs and other frame structures are manufactured from metallic materials such as aluminum, steel, etc.

However, directly attaching carbon composites such as carbon-fiber reinforced plastics to aluminum structures can induce corrosion (e.g., galvanic corrosion) due to chemical and electro-chemical reactions with the surrounding environment. For example, composite materials such as carbon fibers are good electrical conductors and they produce a large galvanic potential with the aluminum alloys of an airplane structure. Thus, corrosion can occur when moisture forms on a composite/aluminum interface due to significantly different electrochemical potentials of these materials. Therefore, in some instances, coupling a composite wing panel directly to a plus chord composed of aluminum may cause an undesirable corrosive effect at that joint. Plus chords composed of titanium protect against such undesirable corrosive effect, but significantly increase the costs of the aircraft.

SUMMARY

An example apparatus disclosed herein includes an inboard composite wing panel having a first end portion configured to be coupled to upper and lower inboard fittings composed of a metallic material and an outboard composite wing panel having a first end portion configured to be coupled to upper and lower outboard fittings composed of a metallic material. A side of body rib has a plate shaped first end portion composed of a metallic material. A fuselage frame is configured to be joined at one end of the upper inboard fitting. The upper and lower inboard fittings and the upper and lower outboard fittings are coupled to the side of body rib at the plate shaped first end portion.

Another example apparatus disclosed herein includes an upper outboard fitting configured to attach to an upper surface of an outboard wing panel and a plurality of lower outboard fittings configured to attach to a lower surface of the outboard wing panel opposite the upper surface. An upper inboard fitting is configured to attach to an upper surface of an inboard wing panel and a plurality of lower inboard fittings is configured to attach to a lower surface of the inboard wing panel opposite the upper surface of the inboard wing panel. A plate extends between the side of body rib and an upper skin of a fuselage such that the upper outboard fitting and the lower outboard fittings couple to a first side of the plate, and the upper inboard fitting and the lower inboard fittings couple to a second side of the plate opposite the first side.

An example method disclosed herein includes attaching an upper outboard fitting and a lower outboard fitting to an end of outboard wing panel, where the upper and lower outboard fittings are composed of a metallic material and the upper outboard wing panel is composed of a composite material; attaching an upper inboard fitting and a lower inboard fitting to an end of an inboard wing panel, where the upper and lower inboard fittings are composed of a metallic material and the upper inboard wing panel is composed of a composite material; and attaching the upper and lower outboard fittings and the upper and lower inboard fittings to a common plate extending from a side of body rib of a central wing box, where the plate is composed of aluminum.

The features, functions and advantages that have been discussed can be achieved independently in various embodiments or may be combined in yet other embodiments further details of which can be seen with reference to the following description and drawings.

Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in direct contact with another part means that there is no intermediate part between the two parts.

DESCRIPTION

A wing of an aircraft is typically coupled to a central wing box of a fuselage via an upper wing joint assembly. For example, a double plus chord is an example upper wing joint assembly typically used in larger airplanes such as jumbo aircrafts to couple an upper wing panel to the central wing box. The double plus chord has a cross-shaped profile that includes vertically extending flanges coupled to a fuselage skin and a side of a body rib or web of the central wing box. The double plus chord also includes flanges that extend laterally or horizontally to each side of the vertically extending flanges that couple or join (e.g., mechanically couple) upper surfaces of an outboard wing panel of the wing and an inboard wing panel of the central wing box. Specifically, the outboard and inboard wing panels are directly coupled to the laterally extending flanges of the double plus chord via fasteners. A double plus chord type joint composed of aluminum is often used with wing panels composed of a metallic material.

To reduce weight and increase performance, aircraft wing panels are often composed of composite materials such as carbon-fiber reinforced plastics or polymers. However, directly coupling a double plus chord composed of aluminum to a wing panel composed of a composite material may cause an undesirable corrosive effect due to significantly different electrochemical potentials of these materials. To protect against such an undesirable corrosive effect, plus chords composed of titanium are often employed. However, titanium plus chords significantly increase manufacturing costs.

The example methods and apparatus disclosed herein provide a structural wing joint assembly that significantly facilitates assembly of an upper wing joint assembly while significantly reducing the number of components and, thus, the weight of an aircraft (e.g., by approximately 800 lbs.). For example, the example structural wing joint assembly does not require use of a complex double plus chord joint assembly often employed by known upper wing joint assemblies. In particular, a plate may be employed instead of a complex double plus chord, thereby significantly reducing manufacturing costs while facilitating assembly of an aircraft wing to a central wing box of the fuselage. Additionally or alternatively, the example structural wing joint significantly increases the strength of the upper wing joint assembly. As a result, a fewer number of fasteners are needed and/or fasteners having smaller diameters or lengths may be employed, thereby significantly reducing costs and increasing assembly efficiency.

Additionally or alternatively, an example wing joint assembly disclosed herein significantly reduces or prevents corrosion between structures composed of aluminum and carbon composites such as carbon fiber reinforced polymers (i.e., CFRP). In particular, an example wing joint assembly disclosed herein significantly reduces or eliminates direct contact between components composed of carbon composites and aluminum materials. To help isolate the components composed of different materials, the example methods and apparatus disclosed herein couple or integrate a side of a body rib of the central wing box (e.g., a lower side of body rib) and an upper fuselage skin via a contiguous plate. (e.g., a vertical plate). For example, the contiguous plate enables a composite wing panel to be separated or spaced apart from an aluminum structure or component, thereby significantly reducing or eliminating direct contact between the composite and aluminum structures or components. Additionally, the example wing panel joint assembly disclosed here further reduces the amount of shimming. Shimming is often provided to reduce a gap between two components coupled together due to manufacturing tolerances.

Figure 1:
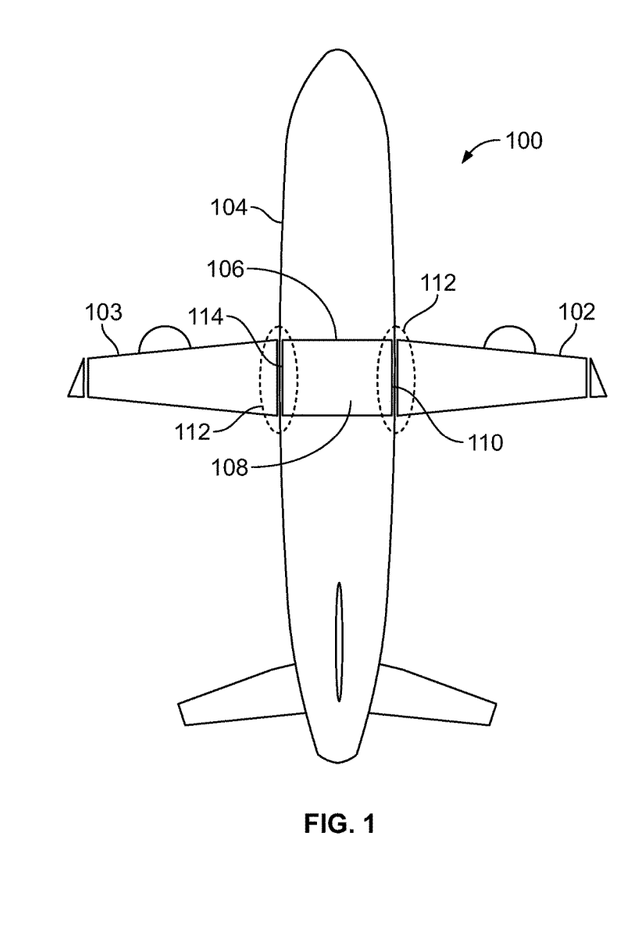
FIG. 1 illustrates an example aircraft constructed with an example structural joint assembly apparatus in accordance with the teachings disclosed herein.

FIG. 1 illustrates an example aircraft 100 constructed in accordance with the teachings disclosed herein. Referring to FIG. 1, the aircraft 100 includes right and left wings 102, 103 extending laterally outward from a fuselage 104. In particular, the wings 102, 103 are coupled or jointed to the fuselage 104 via a center portion or central wing box 106 spanning the fuselage 104. The central wing box 106 includes an upper inboard wing panel 108 that is coupled or joined (e.g., mechanically coupled) to the wings 102, 103. In particular, the right wing 102 of the illustrated example is coupled to a first side 110 of the central wing box 106 via an example structural joint assembly 112 disclosed herein and the left wing 103 is coupled to a second side 114 of the central wing box 106 via the example structural joint assembly 112 disclosed herein. The right wing 102 is substantially similar or identical to the left wing 103 and, thus, for purposes of brevity, only the right wing 102 is discussed below.

Figure 2:
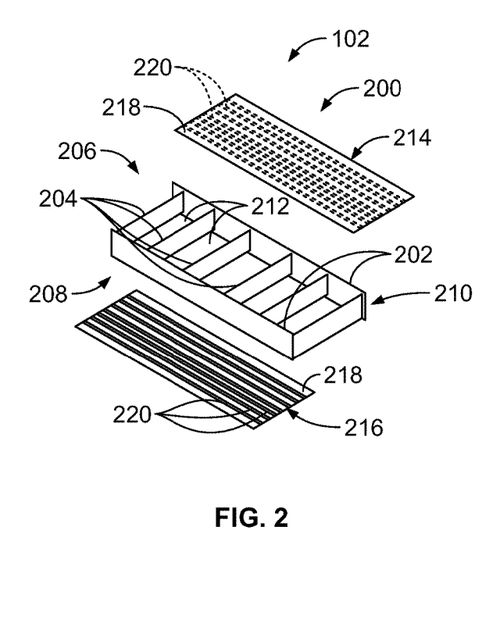
FIG. 2 illustrates a wing panel assembly of the example aircraft of FIG. 1.

FIG. 2 is an exploded view of a portion 200 of the right wing 102 shown in FIG. 1. The right wing 102 includes structural members such as, for example, spars 202 and ribs 204 that form a skeletal like structure or framework 206 (e.g., a wing box) of the wing 102. For example, the ribs 204 extend between a leading edge 208 (e.g., a fore spar) of the wing 102 and a trailing edge 210 (e.g., an aft spar) of the wing 102, thereby dividing the wing 102 into a plurality of cavities 212, which can be used as fuel storing cavities. The framework 206 of the wing 102 provides attachment for upper and lower airfoil wing surfaces in addition to attachment points for engines and control surfaces such as ailerons, trim flaps and airbrakes.

In the illustrated example, the framework 206 is overlaid with an upper outboard wing panel 214 and a lower outboard wing panel 216. More specifically, each of the upper outboard wing panel 214 and the lower outboard wing panel 216 includes a skin 218 coupled or attached to one or more stringers 220, which are structural elements that may run along or span the length of the wing 102 between a wing root and a wing tip. The stringers 220 are arranged to provide structural stability and integrity to the wings 102 by resisting operational loads (e.g., lift loads, drag loads, engine thrust loads, etc.) experienced during flight and when the aircraft is on the ground. The skin 218 and the stringers 220 may be composed of a composite material (e.g., carbon fiber, graphite, etc.). For example, the skin 218 and/or the stringers 220 may be formed by laying up successive layers or plies of composite material (e.g., composite tape, foils, fibrous materials, etc.). In some examples, the skin 218 may be fastened to the stringers 220. Thus, the spars 202 and ribs 204 of the illustrated example may be composed of a metallic material and the skin 218 and the stringers 220 may be composed of a composite material such as, for example, carbon fiber reinforced polymer or plastic. Although not shown, the upper inboard wing panel 108 (FIG. 1) of the central wing box 106 (FIG. 1) may include upper and lower skins and stringers substantially similar or identical to the upper and lower skins 218 and stringers 220 of the upper outboard wing panel 214.

Figure 3:
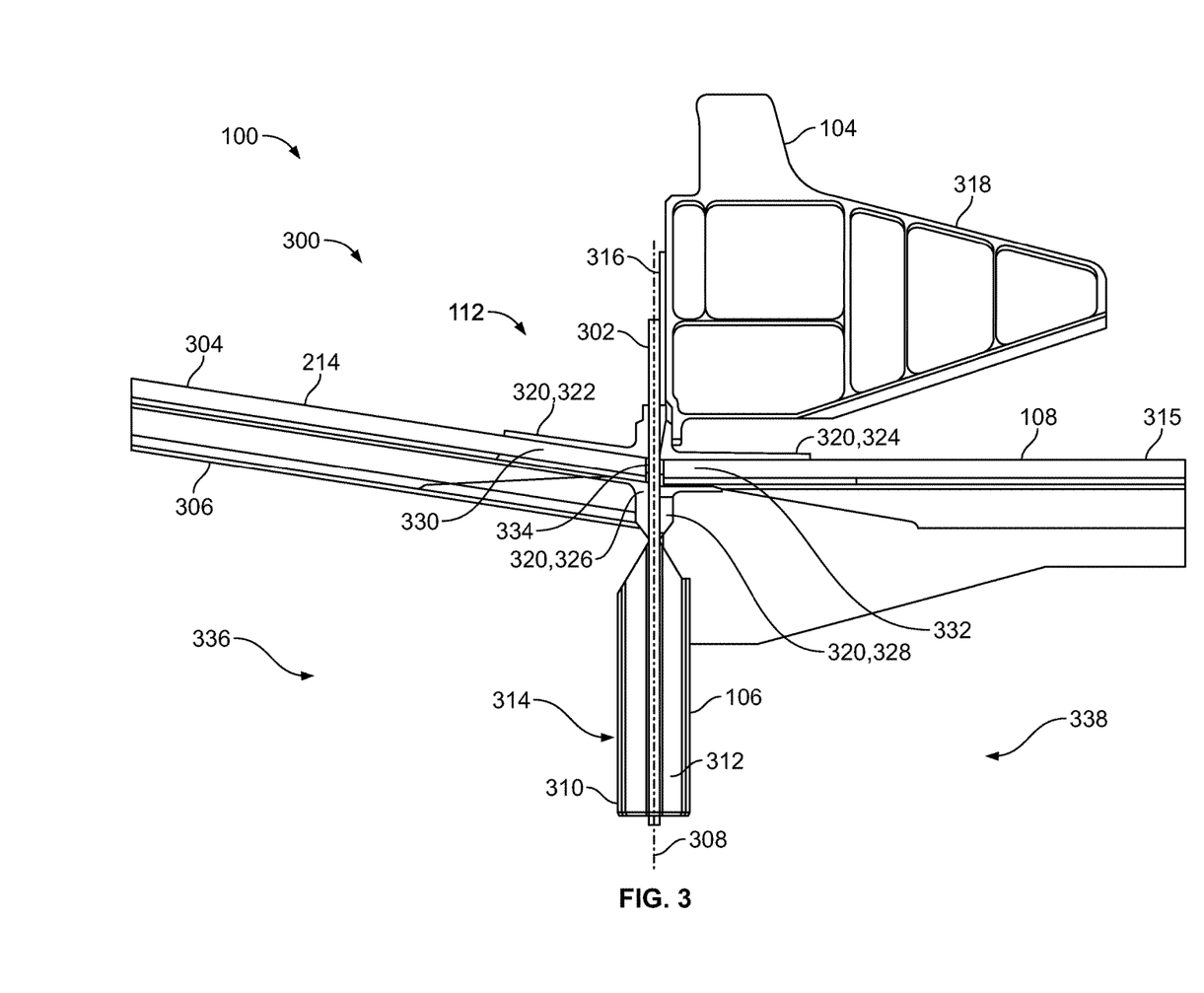
FIG. 3 is a view looking forward of the example structural joint assembly apparatus of FIG. 1.

FIG. 3 is a front view of an example upper wing joint assembly 300 of the example aircraft 100 implemented by the example structural joint assembly 112 disclosed herein. Referring to FIG. 3, the structural joint assembly 112 of the illustrated example couples or attaches (e.g., rigidly couples) the upper outboard wing panel 214 of the wing 102 and the upper inboard wing panel 108 of the central wing box 106. More specifically, the upper outboard wing panel 214 of the wing 102 and the upper inboard wing panel 108 of the central wing box 106 are coupled to a common structure such as a panel, web or plate 302. As shown in FIG. 3, the plate 302 extends between an upper surface or a first side 304 of the upper outboard wing panel 214 and a lower surface or a second side 306 of the upper outboard wing panel 214 opposite the first side 304 in a direction along an axis 308 (e.g., an axis substantially vertical or perpendicular to a longitudinal axis of the fuselage 104 extending between a nose and a tail of the fuselage 104). Thus, the upper outboard wing panel 214 and the upper inboard wing panel 108 attach to the plate 302 via the structural joint assembly 112. In other words, the plate 302 of the illustrated example provides a common attachment point or structure for the structural joint assembly 112.

The plate 302 may be part of the central wing box 106. The central wing box 106 includes a structure or side of body rib 312 that defines a side surface 314 (e.g., the first side 110) of the central wing box 106. For example, the side surface 314 is non-parallel (e.g., substantially perpendicular) relative to an upper surface 315 of the upper inboard wing panel 108. As shown in FIG. 3, the plate 302 is a contiguous or connecting structure extending between at least the side of body rib 312 and an upper skin 316 of the fuselage. The plate 302 of the illustrated example is integrally formed with the side of body rib 312. Thus, the side of body rib 312 has a plate shaped end portion. However, in other examples, the plate 302 may be a separate piece or structure that may couple to the side of body rib 312 via, for example, fasteners.

Additionally, the structural joint assembly 112 enables attachment of a fuselage frame 318 (e.g., a stub beam) via tension fasteners instead of shear fasteners to the upper wing panel as commonly used in some known upper wing panel assemblies. As discussed below, enabling attachment of the fuselage frame 318 via tension fasteners significantly improves assembly efficiency of the fuselage frame 318 by facilitating positioning of tools during assembly and significantly reduces manufacturing costs. Further, the example structural joint assembly 112 disclosed herein significantly reduces manufacturing costs by significantly reducing the amount of fasteners, or the size of the fasteners, needed to couple the upper outboard wing panel 214 to the central wing box 106.

To couple the upper outboard wing panel 214 and the upper inboard wing panel 108 to the plate 302, the structural joint assembly 112 of the illustrated example includes a plurality of fittings 320. For example, the plurality of fittings 320 includes an upper outboard fitting 322 (e.g., a splice chord), an upper inboard fitting 324 (e.g., a splice chord), an outboard stringer fitting 326 and an inboard stringer fitting 328. Specifically, the upper outboard fitting 322 and the outboard stringer fitting 326 are coupled or attached to an end 330 of the upper outboard wing panel 214 and couple the upper outboard wing panel 214 to the plate 302. Similarly, the upper inboard fitting 324 and the inboard stringer fitting 328 are coupled to an end 332 of the composite inboard wing panel 108 of the central wing box 106 and couple the upper inboard wing panel 108 to the plate 302. As a result, a portion 334 of the plate 302 is positioned or captured between the upper outboard fitting 322 and the outboard stringer fitting 326 coupled to an outboard side 336 of the plate 302 and the upper outboard fitting 324 and the inboard stringer fitting 328 coupled to an inboard side 338 of the plate 302. Thus, the upper outboard wing panel 214 and the upper inboard wing panel 108 are separated or spaced apart by at least a thickness of the plate 302. The structural joint assembly 112 may include one or more upper outboard fittings 322 and one or more outboard stringer fittings 326 positioned between fore and aft ends of the wing 102, and one or more upper inboard fittings 324 and one or more inboard stringer fittings 328 positioned between fore and aft ends of the central wing box 106. The fittings 320 of the illustrated example may be composed of a metallic material such as, for example, steel, an alloy and/or any other suitable material(s). Further, the example fittings 320 have an L-shaped cross-sectional profile or shape. However, in other examples, the fittings 320 may include any other suitable cross-sectional shape or profile.

Figure 4:
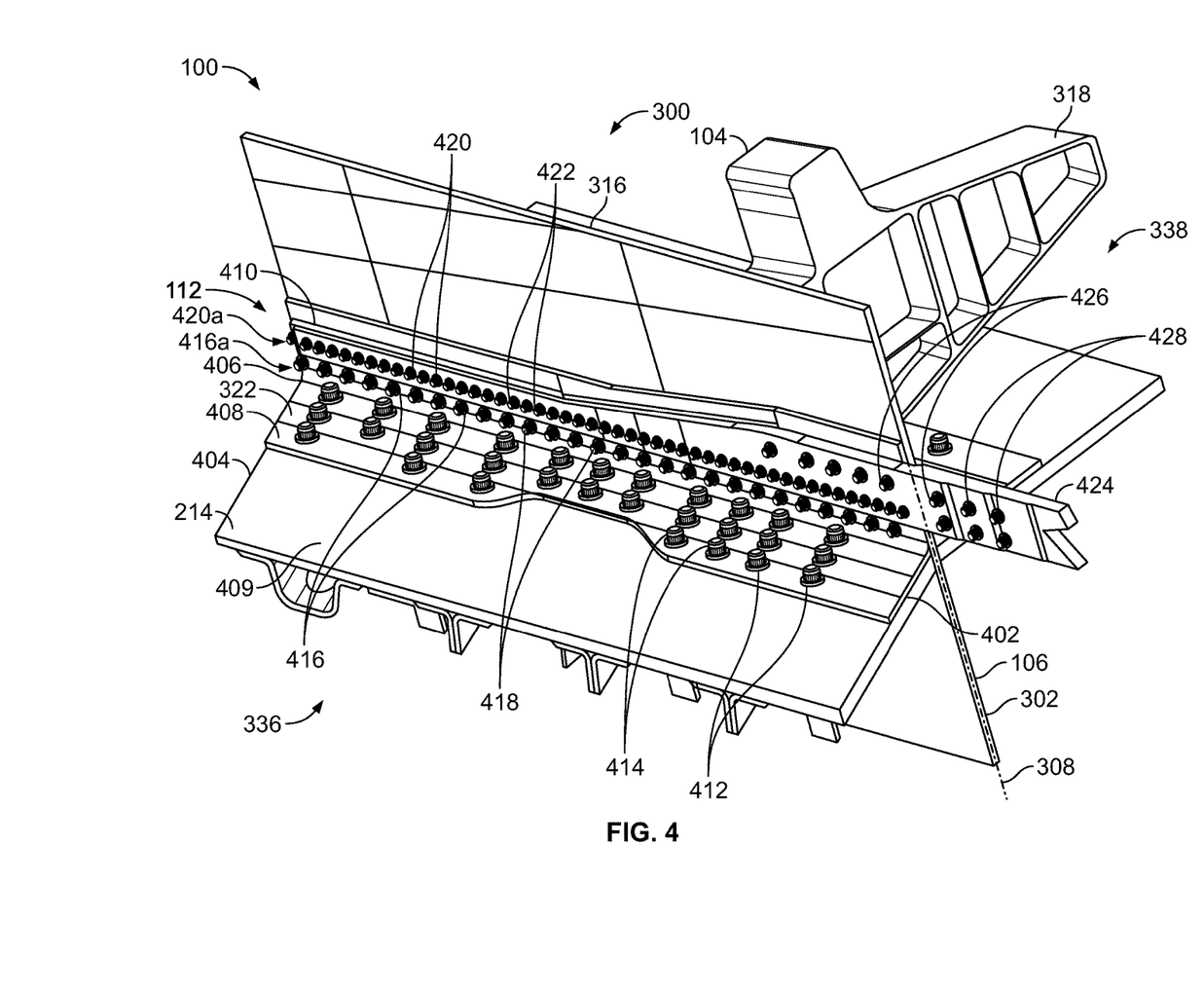
FIG. 4 is a perspective view of the example structural joint assembly apparatus of FIGS. 1 and 3.

FIG. 4 is a perspective view of the upper wing joint assembly 300 and the example structural joint assembly 112 of FIGS. 1 and 3, viewed from the outboard side 336 the fuselage 104 toward the inboard side 338. Referring to FIG. 4, the upper outboard fitting 322 extends in a longitudinal direction across the upper outboard wing panel 214 in a direction non-parallel to the axis 308 (e.g., in a direction defined by a fore end 402 of the upper outboard wing panel 214 and an aft end 404 of the upper outboard wing panel 214). The upper outboard fitting 322 of the illustrated example is a continuous body 406 having a first leg 408 in engagement with an upper surface 409 of the upper outboard wing panel 214 and a second leg 410 in engagement with the outboard side 336 of the plate 302 extending from the side of body rib 312 (FIG. 3). In other words, the first leg 408 is a wall extending substantially parallel to the upper surface 409 of the upper outboard wing panel 214 and the second leg 410 is a wall extending substantially parallel to the plate 302. Thus, the first leg 408 and second leg 410 form an L-shaped cross-sectional profile. More specifically, the first leg 408 protrudes from the second leg 410 at an angle (e.g., an acute angle) relative to the second leg 410 to enable the first leg 408 to be substantially parallel relative to the upper surface 409 and the second leg 410 to be substantially parallel relative to the plate 302.

In the illustrated example, the first leg 408 includes a plurality of openings 412 to receive a plurality of compression fasteners 414. Similarly, the second leg 410 includes a first plurality of openings 416 to receive a first plurality of tension fasteners 418. To provide redundant safety, the second leg 410 also includes a second plurality of openings 420 to receive a second plurality of tension fasteners 422 (e.g., tension fasteners). In the illustrated example, the first plurality of openings 416 are arranged in a first row 416a and the second plurality of openings 420 are arranged in a second row 420a along the length of the second leg 410.

Additionally, the example upper outboard fitting 322 of the illustrated example includes a longeron 424. The longeron 424 of the illustrated example is integrally formed with the second portion 410 of the upper outboard fitting 322 and may have a length that extends beyond the end 402 of the first leg 408. The longeron 424 of the illustrated example may have a dimensional profile (e.g., a height and/or thickness) that is different from a dimensional profile (e.g., a height and/or thickness) of the second leg 410. The longeron 424, for example, includes openings 426 configured to receive tension fasteners 428 to couple the longeron 424 to the plate 302, the fuselage skin 316, the fuselage frame 318 and/or any other structure(s) of the aircraft framework. For example, the longeron 424 may be configured to support the fuselage skin 316 and helps transfer loads from fuselage skin 316 and/or the wings 102, 103 to the fuselage frame 318. Integrally forming the longeron 424 with the upper outboard fitting 322 improves the structural rigidity of the aircraft framework. With the longeron 424 providing an increased strength to the framework of the aircraft 100, smaller sized fasteners and/or fewer fasteners may be employed, thereby reducing manufacturing costs, aircraft weight and/or facilitating attachment of the wings 102 to the central wing box 106. For example, the longeron 424 of the illustrated example provides improved strength to an aircraft frame compared to a longeron formed and attached as a separate piece or structure.

Figure 5:
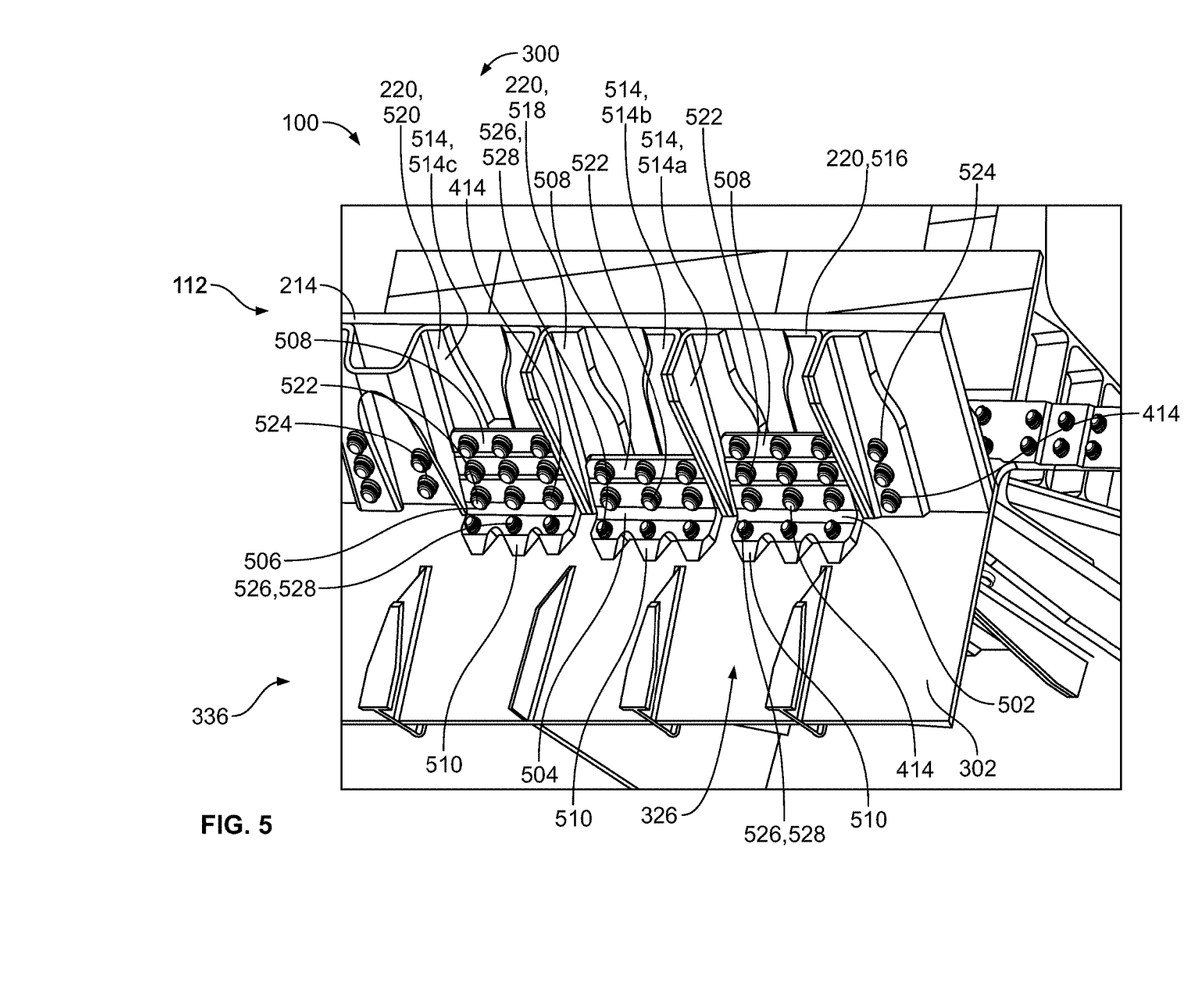
FIG. 5 illustrates a perspective view of the example structural joint assembly apparatus of FIGS. 1, 3 and 4.

FIG. 5 is a perspective view of the example upper wing joint assembly 300 of FIGS. 1 and 2-4 showing the outboard stringer fitting 326. Referring to FIG. 5, the outboard stringer fitting 326 of the example structural joint assembly 112 includes a plurality of outboard stringer fittings 502, 504, 506. Each of the inboard stringer fittings 502-506 includes a first leg 508 and a second leg 510 that define an L-shaped cross-sectional profile. As shown in FIG. 5, the first leg 508 engages a lower surface or respective ones of the stringers 220 of the upper outboard wing panel 214 and the second leg 510 engages the outboard side 336 of the plate 302. More specifically, the first leg 508 protrudes from the second leg 510 at an angle (e.g., an obtuse angle) relative to the second leg 510 to enable the first leg 508 to be substantially parallel relative to the stringers 220 (e.g., substantially flush with the stringers 220), while the second leg 510 is substantially parallel to the plate 302 (e.g., substantially flush with the plate 302).

Each of the outboard stringer fittings 506-508 is positioned within a channel 514 formed by respective ones of the stringers 220. Each of the channels 514 may have different dimensions or profiles. For example, a first stringer 516 may be a heavy stringer capable of supporting greater amounts of loads than a second stinger 518 (e.g., a light stringer) and, thus, may be formed with a larger channel 514a than a channel 514b of the second stringer 518. A third stringer 520 may be configured as a vent stringer, which may have a narrower channel 514c than, for example, the channels 514a, 514b of the first and second stringers 516, 518. Accordingly, the example stringer fittings 502-506 may have different dimensional profiles or shapes to accommodate the different types of stringers 516-520.

The first leg 508 of each of the stringers fittings 502-506 of the illustrated example includes a plurality of openings 522 to receive the respective ones of the compression fasteners 414. In particular, the openings 522 in the first leg 508 of the outboard stringers 502-506 align with the openings 412 (FIG. 4) of the first leg 408 of the upper outboard fitting 322. In this manner, the upper outboard wing panel 214 is clamped or captured between the upper outboard fitting 322 and the outboard stringer fittings 502-506. Additionally, the stringers 220 and/or the upper outboard wing panel 214 may include openings 524 to receive the compression fasteners 414 from the upper outboard fitting 322. The second leg 510 of the stringer fittings 502-506 includes openings 526 to receive one or more tension fasteners 528 that attach the stringer fittings 502-506 to the plate 302.

Figure 6:
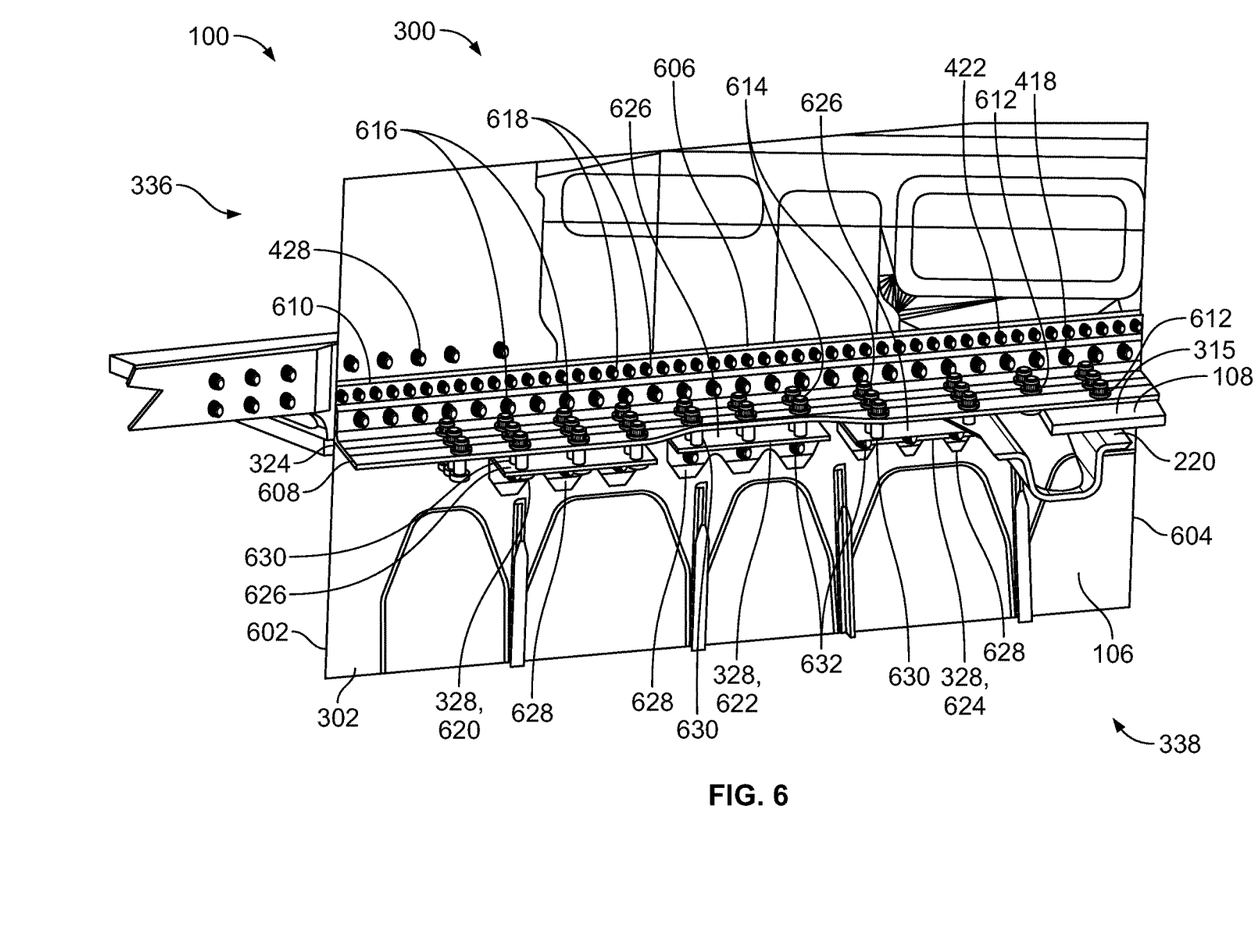
FIG. 6 illustrates another perspective view of the example structural joint assembly apparatus of FIGS. 1 and 3-5.

FIG. 6 is a perspective view of the upper wing joint assembly 300 of FIGS. 3-5 viewed from the inboard side 338 toward the outboard side 336. Referring to FIG. 6, the upper inboard fitting 324 extends in a longitudinal direction across the inner wing panel 108 of the central wing box 106 (e.g., in a direction between a fore end 602 of the central wing box 106 and an aft end 604 of the central wing box 106). The upper inboard fitting 324 of the illustrated example has a continuous body 606 that includes a first leg 608 (e.g., a wall extending substantially parallel to the upper surface 315 of the upper inboard wing panel 108) and a second leg 610 (e.g., a wall or splice chord extending substantially parallel to the plate 302). The first leg 608 engages or couples to the upper surface 315 of the upper inboard wing panel 108 and the second leg 610 engages or couples to the inboard side 338 of the plate 302. The first leg 608 includes a first plurality of openings 612 to receive a plurality of compression fasteners 614. In addition, the second leg 610 of the illustrated example includes openings 616 and 618 that align or cooperate with the respective openings 416 and 420 of the second leg 410 of the upper outboard fitting 322 to receive the tension fasteners 418 and 422, respectively. As a result, the plate 302 is positioned or captured between the second legs 410 and 610 of the respective upper outboard fitting 322 and upper inboard fitting 324. Further, as shown in FIG. 6, the second leg 610 of the upper inboard fitting 324 does not interfere with the fasteners 428 of the longeron 424 that are coupled to the plate 302.

Referring to FIG. 6, the inboard stringer fitting 328 of the illustrated example includes a plurality of inboard stringer fittings 620, 622, 62. Like the outboard stringer fittings 502-506, the inboard stringer fittings 620-624 may have a dimensional profile or envelope to conform to different types of stringers that may be employed by the upper inboard wing panel 108 such as, for example, a heavy stringer, a light stringer, a vent stringer, etc. For example, although not shown, the upper inboard wing panel 108 may include stringers 220 substantially similar to the stringers 220 of the upper outboard wing panel 214. Each of the inboard stringer fittings 620-624 includes a first leg 626 and a second leg 628 that define an L-shaped cross-sectional profile such that the first leg 626 engages a lower surface or a stringer 220 of the upper inboard wing panel 108 and the second leg 628 engages the inboard side 338 of the plate 302. The first leg 626 include a plurality of openings 630 that align with the respective openings 612 of the first leg 608 of the upper inboard fitting 324 and receive respective ones of the compression fasteners 614 (e.g., compression fittings) to clamp or capture the upper inboard wing panel 108 between the first legs 608 and 626 of the upper inboard fitting 324 and the inboard stringer fittings 620-624. The second leg 628 includes a plurality of openings 632 that align with the respective openings 526 of the second leg 510 of the outboard stringer fittings 502-506 to receive the respective tension fasteners 528 to couple the upper inboard wing panel 108 to the plate 302. More specifically, the plate 302 is positioned or captured between the second legs 510, 628 of the respective outboard stringer fittings 502-506 and the inboard stringer fittings 620-624.

Figure 7:
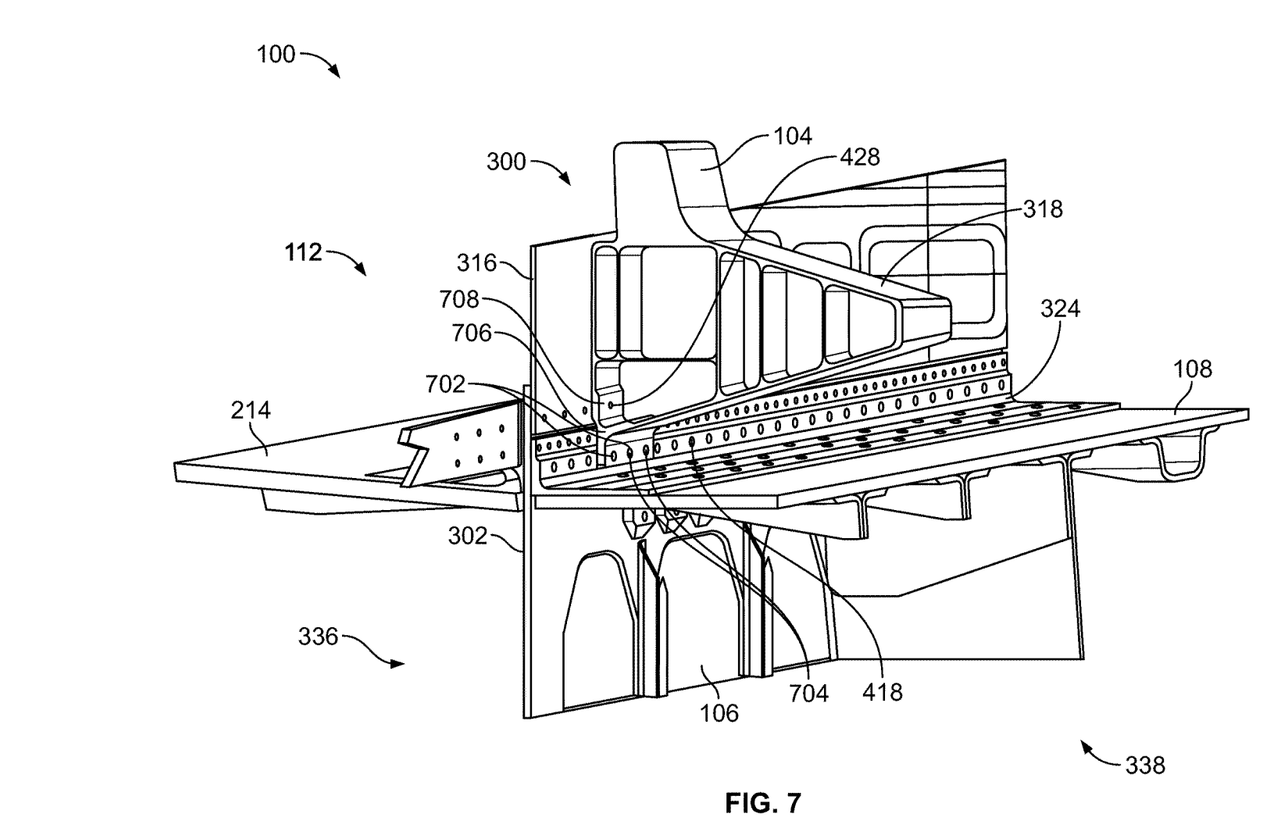
FIG. 7 illustrates another perspective view of the example structural joint assembly apparatus of FIGS. 1 and 3-6.

FIG. 7 is another perspective view of the example upper wing joint assembly 300 viewed from the fore end 602, inboard side 338 of the central wing box 106 toward the aft end 604 of the central wing box 106. As shown in FIG. 7, the fuselage frame 318 is attached to the plate 302 via the upper inboard fitting 324. More specifically, the fuselage frame 318 includes one or more openings 702 configured to receive one or more tension fasteners 704. The tension fasteners 704 are longer than the tension fasteners 418 to accommodate for a thickness of a mounting plate 706 of the fuselage frame 318. Additionally or alternatively, the fuselage frame 318 may include one or more openings 708 to receive the fastener 428 of the longeron 424. Further, the fuselage skin 316 of the illustrated example is attached to the fuselage frame 318 and the plate 302.

Attachment of the fuselage frame 318 via the structural joint assembly 112 significantly facilitates assembly and/or attachment of the wing 102 to the central wing box 106. In particular, the example structural joint assembly 112 disclosed herein enables the fuselage frame 318 to be coupled to the structural joint assembly 112 via the tension fasteners 704 and/or fasteners 428 of the longeron 424 instead of compression type fasteners typically employed by known upper panel structural joints. More specifically, the example structural joint assembly 112 of the illustrated example enables attachment of the fuselage frame 318 via the tension fasteners 704, 428 each having a substantially horizontal axis. For example, the tension fasteners 704, 428 are substantially parallel relative to the upper surface 315 of the upper inboard wing panel 108. As a result, the example structural joint assembly 112 of the illustrated example facilitates assembly by providing greater space and/or accessibility to enable a tool (e.g., a pneumatic drill) to access the structural joint assembly 112 to fasten the tension fasteners 704, 428 as opposed to compression fasteners, which have substantially vertical axes.

Figure 8:
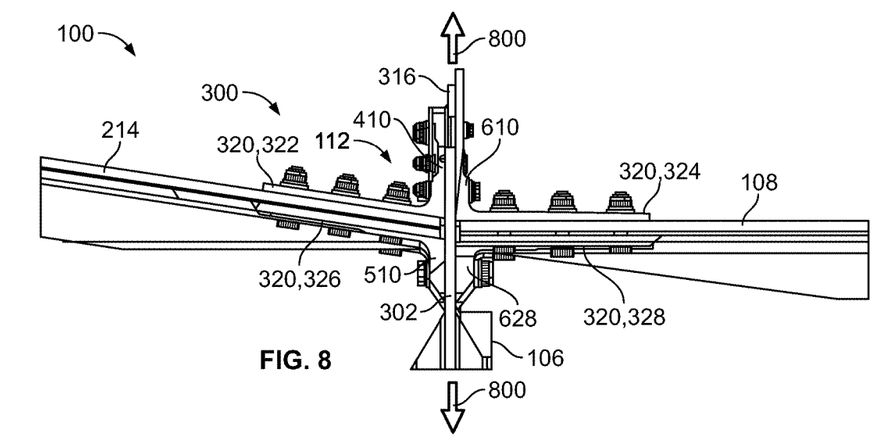
FIG. 8 is a view looking forward of the example structural joint assembly apparatus of FIGS. 1 and 3-7 illustrating a first load path.
Figure 9:
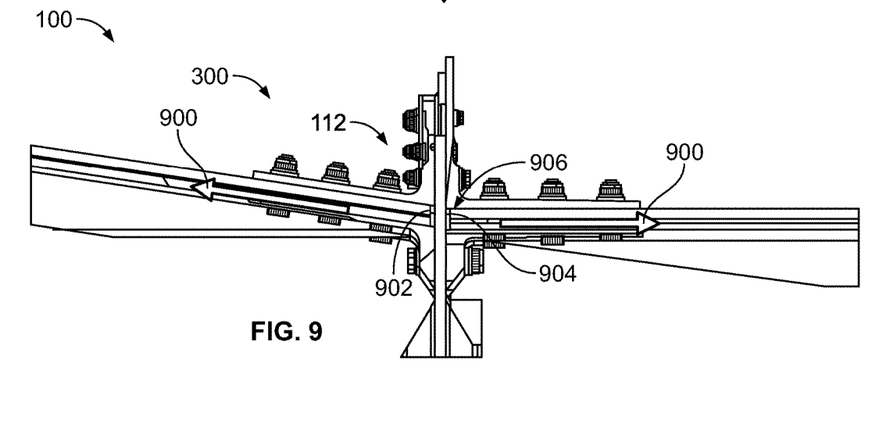
FIG. 9 is a view looking forward of the example structural joint assembly apparatus of FIGS. 1 and 3-8 illustrating a second load path.

FIGS. 8 and 9 are front views of the example structural joint assembly 112 of FIGS. 1-7. FIG. 8 illustrates the plate 302 extending between the central wing box 106 and the fuselage skin 316 and captured between the second legs 410, 510, 610, 628 of the respective upper outboard fitting 322, the upper inboard fitting 324, the outboard stringer fitting 326 and inboard stringer fitting 328. As a result, integration of the fuselage skin 316 and the side of body rib 312 via the plate 302 helps to isolate components composed of different materials. For example, the plate 302 and/or the fuselage skin 316 may be composed of aluminum and each of the upper outboard wing panel 214 and the upper inboard wing panel 108 may be composed of a composite material (e.g., carbon fiber reinforced polymers). However, as illustrated in FIGS. 8 and 9, neither the plate 302 nor the fuselage skin 316 are in direct contact with the upper outboard wing panel 214 and the upper inboard wing panel 108. Instead, the respective fittings 320 are coupled between the plate 302 and/or the fuselage skin 316. Thus, the structural joint assembly 112 significantly reduces and/or eliminates direct contact between the aluminum components (e.g., the plate 302) and the composite components (e.g., the upper outboard wing panel 214 and the upper inboard wing panel 108), thereby eliminating or significantly reducing a corrosion effect that may otherwise occur if the plate 302 was in direct contact with the upper inboard wing panel 108 and the upper outboard wing panel 214 composed of composite materials.

Additionally or alternatively, the example structural joint assembly 112 of the illustrated example provide a direct or continuous load path 800 (e.g., a vertical load path) between the central wing box 106 and the fuselage skin 316 and/or the fuselage frame 318 (FIG. 7). In this manner, the plate 302 provides the continuous load path 800 to enable forces or loads (e.g., shear loads, lift loads, drag loads, etc.) to be distributed more efficiently and/or effectively to the framework of the aircraft 100. Similarly, the example structural joint assembly 112 provides a more uniform or balanced tension load path 900 to more efficiently and/or effectively enable loads (e.g., shear loads, lift loads, etc.) imparted to the wings 102, 103 to be transferred to the fuselage frame 318 and/or the longeron 424. In particular, to provide the more uniform or balanced tension load path 900, the example structural joint assembly 112 enables respective ends 902 and 904 of the upper outboard wing panel 214 and the upper inboard wing panel 108 to be spaced relatively close together. As a result, the structural joint assembly 112 significantly reduces a gap 906 between the upper outboard wing panel 214 and the upper inboard wing panel 108, thereby increasing the strength of the upper wing joint assembly 300. In other words, reducing the size of the gap 906 provides a structural advantage because a smaller gap reduces stress imparted to the structural joint assembly 112. As a result, significantly fewer fasteners (e.g., 240 fewer fasteners) and/or smaller fasteners (e.g., having smaller diameters or lengths) may be employed, thereby significantly reducing the weight of the aircraft 100, reducing manufacturing costs, and/or increasing assembly efficiency. Contrary to other known upper wing joint assemblies that employ compression fasteners to couple a body chord or plate to a splice plate, a gap larger than the gap 906 is needed to allow access to the compression fasteners to couple the body chord (e.g., a T-portion) to the splice plate and/or a side of body rib chord. In contrast, the example structural joint assembly 112 does not include fasteners positioned in the gap 906, therefore the gap 906 may be significantly smaller and/or eliminated. In some examples, shims and/or other non-corrosive inducing materials may be positioned between the end 902 and the outboard side 336 of the plate 302 and/or between the end 904 and the inboard side 338 of the plate 302 to further reduce the size or eliminate the gap 906.

Figure 10:
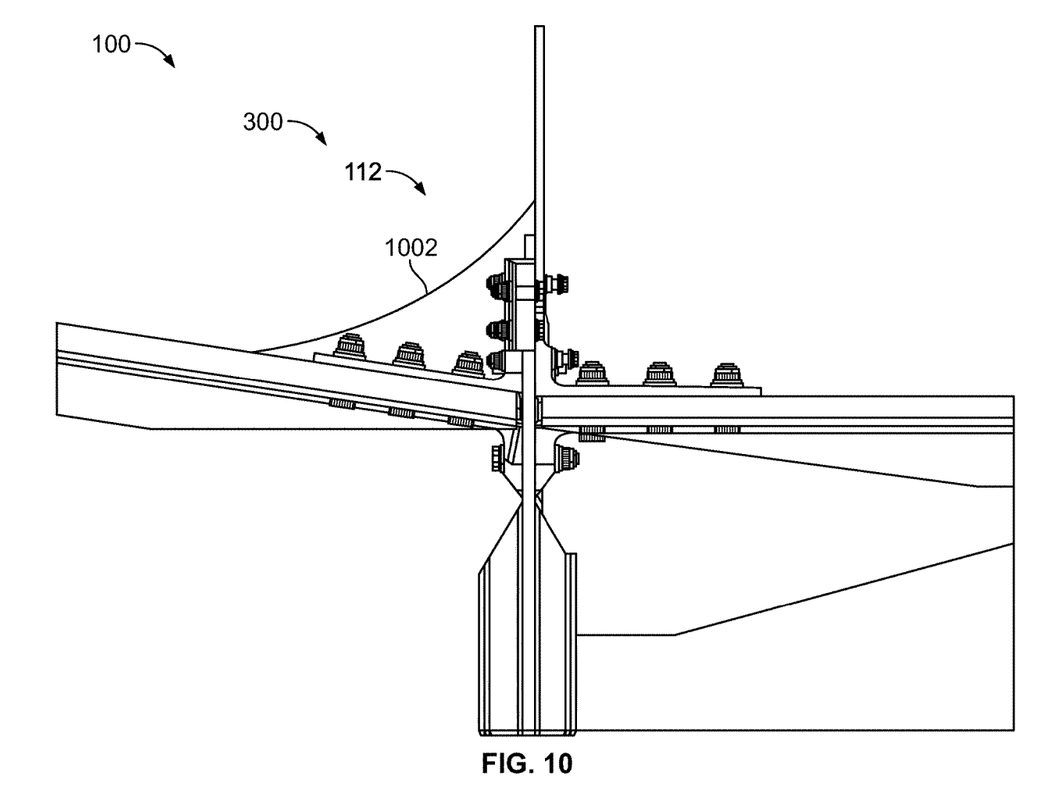
FIG. 10 is yet another view looking forward of the example structural joint assembly apparatus of FIGS. 1 and 3-9 illustrating an example overwing fairing of the example aircraft.

FIG. 10 is another front view of the example structural joint assembly 112 of FIGS. 1-9. As shown in FIG. 10, the example structural joint assembly 112 provides a relatively narrow or smaller joint assembly compared to known upper wing joint assemblies. As a result, the example structural joint assembly 112 enables a smaller overwing fairing 1002 to be employed that significantly reduces drag and, thus, increases the efficiency of the aircraft 100. Additionally, the structural joint assembly 112 is substantially covered or positioned under the fairing 1002, which shields or protects the structural joint assembly 112 from environmental conditions (e.g., lightning strikes, etc.).

Figure 11:
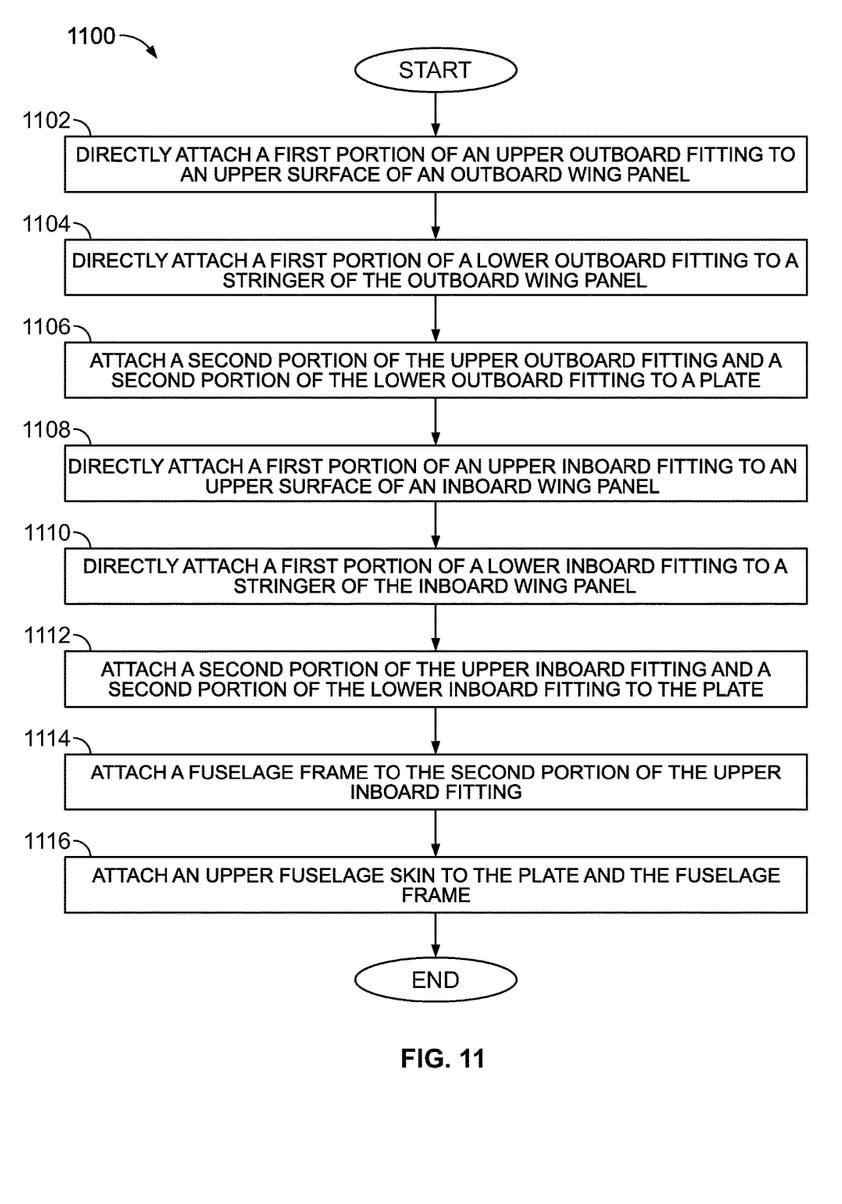
FIG. 11 depicts a flowchart of an example method to assemble an example upper wing assembly of the example aircraft using the example structural joint assembly apparatus disclosed herein.

FIG. 11 is a flowchart of an example method 1100 that may be used to assemble an example upper wing such as the example upper wing joint assembly 300 of FIGS. 1-10 using an example structural joint assembly 112 disclosed herein. While the example method 1100 may be used to assemble an example upper wing of the aircraft 100 described herein, one or more of the blocks and/or processes illustrated in FIG. 11 may be combined, divided, re-arranged, omitted, eliminated and/or implemented in any other way. Further still, the example method of FIG. 11 may include one or more processes and/or blocks in addition to, or instead of, those illustrated in FIG. 11, and/or may include more than one of any or all of the illustrated processes and/or blocks. Although the example method 1100 is described with reference to the flowchart illustrated in FIG. 11, many other methods of assembling the example upper wing joint assembly 300 may alternatively be used. Because the example method 1100 may be used to assemble the example upper wing joint assembly 300 of FIGS. 1-10, those components identified in FIGS. 1-10 that have functions substantially similar or identical to the functions of those components described below will not be described in detail again. Instead, the interested reader is referred to the above corresponding descriptions. To facilitate this process, the same reference numbers will be used for like structures.

The example method of assembling an example upper wing disclosed herein is discussed in connection with the example upper wing 300 of FIGS. 1-10. An example method 1100 disclosed herein may begin by directly attaching the first leg 408 of the upper outboard fitting 322 (e.g., a splice chord) to the upper surface 409 of the upper outboard wing panel 214 via compression fasteners 414. (block 1102). More specifically, the upper outboard wing panel 214 and the first leg 408 of the upper outboard fitting 322 may include openings to receive respective ones of compression fasteners 414.

After the upper outboard fitting 322 is coupled to the upper outboard wing panel 214, the lower outboard fitting 326 is directly attached to one or more stringers 220 of the upper outboard wing panel 214. (block 1104). In particular, the first legs 508 of the outboard stringer fittings 502, 504, 506 are directly attached to the stringer 220 of the upper outboard wing panel 214.

With the upper outboard wing panel 214 being secured to the upper outboard fitting 322 and lower stringer fitting 326 at block 1104, the upper outboard fitting 322 and lower stringer fitting 326 are attached to the plate 302 of the side of body rib 312 of the central wing box 106. (block 1106). More specifically, the second leg 410 of the upper outboard fitting 322 and the second legs 510 of each of the lower outboard stringer fittings 502-506 are attached to the plate 302.

The first leg 608 of the upper inboard fitting 324 is then directly attached to the upper surface 315 of the upper inboard wing panel 108 via, for example, the plurality of compression fasteners 614. (block 1108). After the upper inboard fitting 324 is coupled to the upper inboard wing panel 108, the lower stringer fitting 328 is directly attached to the stringer 220 of the upper inboard wing panel 108. (block 1110). In particular, the first legs 626 of each of the inboard stringer fittings 620, 622, 624 are directly attached to the respective stringers 220 of the upper inboard wing panel 108.

With the upper inboard wing panel 108 being secured to the upper and lower inboard fittings 324, 328 at block 1110, the second leg 610 of the upper inboard fitting 324 and the second legs 626 of each of the lower inboard fittings 620-624 are attached to the plate 302 via, for example, the tension fasteners 418 and 422. (block 1112).

The fuselage frame 318 is then attached to the plate 302 via the second leg 610 of the upper inboard fitting 324. (block 1114). In particular, the fuselage frame 318 is attached to the second leg 610 via the tension fasteners 704 each having an axis substantially perpendicular to the plate 302, thereby facilitating attachment of the fuselage frame 318 to the plate 302. With the fuselage frame 318 attached to the plate 302, the fuselage skin 316 is attached to the plate 302 and/or the fuselage frame 318. (block 1116).

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus for joining a wing structure of an aircraft, the aircraft comprising a fuselage frame and a fuselage skin, the apparatus comprising:
    an inboard composite wing panel having a first upper surface and a first lower surface opposite the first upper surface, the first upper surface having a first end portion configured to be coupled to an upper inboard fitting and a lower inboard fitting;
    an outboard composite wing panel having a second upper surface and a second lower surface opposite the first upper surface, the second upper surface having a second end portion configured to be coupled to an upper outboard fitting and a lower outboard fitting, each of the upper inboard fitting, the lower inboard fitting, the upper outboard fitting, and the lower outboard fitting being composed of a metallic material;
    a plate composed of a metallic material, the plate extending from a side of body rib of a central wing box formed monolithic with the side of body rib,
    the plate having a unitary body extending below the first lower surface of the inboard composite wing panel and above the first upper surface of the inboard composite wing panel, the plate providing an interface between the inboard composite wing panel and the outboard composite wing panel,
    the plate extending between the upper outboard fitting, the lower outboard fitting, the upper inboard fitting and the lower inboard fitting such that the upper outboard fitting and the lower outboard fitting couple to a first side of the plate and the upper inboard fitting and the lower inboard fitting couple to a second side of the plate opposite the first side, the plate to couple to the fuselage skin positioned above the inboard composite wing panel; and
    a longeron, monolithic with a portion of the upper outboard fitting, the longeron to receive fasteners to couple the longeron to the plate, the fuselage skin, the fuselage frame and the upper inboard fitting.

2. An apparatus as defined in claim 1, wherein the upper outboard fitting extends across at least a portion of the outboard composite wing panel.

3. An apparatus as defined in claim 1, wherein each of the lower outboard and inboard fittings includes a plurality of fittings.

4. An apparatus as defined in claim 1, wherein the inboard composite wing panel and the outboard composite wing panel are separated by the plate.

5. An apparatus as defined in claim 1, wherein the plate extends between a fore edge of the outboard composite wing panel and an aft edge of the outboard composite wing panel.

6. An apparatus of claim 1, wherein each of the upper inboard fitting, the lower inboard fitting, the upper outboard fitting, and the lower outboard fitting has an L-shaped cross-section.

7. An apparatus as defined in claim 3, wherein a first fitting from the plurality of fittings has a first shape and a second fitting from the plurality of fittings has a second shape different from the first shape.

8. A method for joining a wing structure of an aircraft, the aircraft comprising a fuselage frame and a fuselage skin, the method comprising:
    attaching an upper outboard fitting and a lower outboard fitting to an end of an outboard wing panel, attaching an upper inboard fitting and a lower inboard fitting to an end of an inboard wing panel, each of the upper inboard fitting, the lower inboard fitting, the upper outboard fitting, and the lower outboard fitting having an L-shaped cross-section and being composed of a metallic material, each of the upper-inboard wing panel, the lower inboard wing panel, the upper outboard wing panel and the lower outboard wing panel being composed of a composite material;

attaching the upper outboard fitting, the lower outboard fitting, the upper inboard fitting, and lower inboard fittings to a plate, extending from a side of body rib of a central wing box, the plate being monolithically formed with the side of body rib and composed of a metallic material, the plate being a unitary body extending below a lower surface of the inboard wing panel and above an upper surface of the inboard wing panel, the plate extending between the upper outboard fitting, the lower outboard fitting, the upper inboard fitting and the lower inboard fitting, attaching to the plate the fuselage skin that is positioned above the inboard wing panel; and attaching a longeron monolithically formed with a portion of the upper outboard fitting, to the plate, the fuselage skin, the fuselage frame, and the upper inboard fitting via fasteners receivable by the longeron.

9. A method of claim 8, wherein attaching the lower outboard fitting and the lower inboard fitting to the plate comprises attaching a plurality of lower outboard fittings and a plurality of lower inboard fittings to the plate by positioning the plurality of lower outboard fittings and the plurality of lower inboard fittings within respective channels of stringers formed in the upper outboard panel and inboard wing panel.

10. A method of claim 8, further comprising attaching the upper outboard fitting and the lower outboard fitting to the end of outboard wing panel prior to attaching the upper outboard fitting and the lower outboard fitting to the plate.

11. A method of claim 8, further comprising attaching the upper outboard fitting, the lower outboard fitting, the upper inboard fitting and the lower inboard fitting to the plate via tension fasteners.

12. A method of claim 8, wherein the plate extends between a fore end of the outboard wing panel and an aft end of the outboard wing panel.

13. A method of claim 10, further comprising attaching the upper inboard fitting and the lower inboard fitting to the end of the inboard wing panel prior to attaching the upper inboard fitting and the lower inboard fitting to the plate.

14. A method of claim 13, further comprising attaching the fuselage frame to the upper inboard fitting after the upper outboard fitting, the lower outboard fitting, the upper inboard fitting and lower inboard fitting are attached to the plate.

15. A method of claim 14, further comprising attaching the fuselage frame to the upper inboard fitting via one or more tension fasteners.

* * * * *